United States Patent Office.

DANIEL RUGGLES, OF FREDERICKSBURG, VIRGINIA.

Letters Patent No. 103,085, dated May 17, 1870.

IMPROVEMENT IN COMPOSTING MANURES AND FERTILIZERS.

The Schedule referred to in these Letters Patent and making part of the same

I, DANIEL RUGGLES, of Fredericksburg, county of Spottsylvania and State of Virginia, have invented a Process of Applying Steam, chemically, by direct contact with animal, vegetable, mineral, liquid, fluid, and gaseous substances for the rapid Composting of Manures, or "plant food," for agricultural uses, of which the following is a specification.

Prepare on firm ground an earth-basin about twenty feet in diameter and two feet deep, place on the bottom small poles two feet apart, and cross them with other small poles three feet apart, for ventilation and the flow of liquid manures. Set a barrel, tierce, or tank, pierced with several auger-holes, firmly in the ground in the center of the basin, as a steam-condenser, connected by a pipe with the source of steam. Set a deal-board pump in contact with one orifice in the condenser, so arranged and of sufficient height to raise the accumulating liquids to the summit of the compost stack with facility; use small poles, pointed, radiating from orifices of the steam-condenser, so as, when withdrawn, to facilitate the diffusion of steam through the mass.

Then arrange materials for composting in the following order:

One foot brush, one foot cornstalks, straw or leaves, well moistened with liquid manure or water, five bushels of wood or coal ashes, half a barrel of quicklime, one foot of shell or green sand, marl, muck, peat, or marsh-mud, two feet of stable manure, one bushel of salt, one foot of saw-dust or tanyard-bark, one foot of shell, marl, peat, or muck, half barrel of quicklime, one bushel of salt, two feet of straw or forest leaves and other vegetable and animal matter, well rammed and moistened, two feet of stable-manure, one bushel of salt, one foot of straw or forest leaves, half barrel of quick-lime, five bushels of wood ashes, one foot of marl, peat, or muck, one foot of straw or forest leaves, two feet of stable-manure, one bushel of salt, one foot of marl or muck, five bushels of coal ashes, also poudrette, vegetable-mold, fish, &c. Thus build the compost-stack to the desired height, varying the combinations, and then cap it with plastic marl, muck, peat, or clay-loam well rammed, to protect from leeching rains, and to prevent the dispersion of steam and gases.

The mass having been well moistened and arranged, apply steam and control its action. Return liquid manures to the mass through orifices in the cap as fast as they accumulate in the earth basin below, and add water as wanted to facilitate decomposition. By immediate contact with the compost, steam acts chemically, and supplies artificial heat, inducing chemical action. The materials may be arranged in vats, tanks, vessels, &c., open to the action of the air, or confined and under pressure.

The process will supply compost manures for use in the least possible time, and of a quality best adapted as "plant-food" for stimulating vegetation, and the improvement of soils, thus enabling the planter to keep a constant supply, and so thoroughly digested as to materially abridge the period of vegetation.

It is proposed thus to economise the material resources of plantations by composting straw, cornstalks, weeds, brush, cotton-seed, stable manures, wood and coal ashes, forest leaves, poudrette, saw-dust, tanbark, wood and vegetable-mold, sea-weed, fish, lime, marl, gypsum, muck, marsh-mud, peat, clay-loam, salt, salt-water, and other mineral waters, and all mineral, vegetable, and animal substances, and, in combination with "special manures," when found expedient, guano, &c.

Claim.

I claim as my invention—

The process of applying steam, chemically, by direct contact with animal, vegetable, mineral, liquid, fluid, and gaseous substances for the rapid composting of manures or "plant-food" for agricultural uses.

DANIEL RUGGLES.

Witnesses:
REBECCA SEYMOUR TALIAFERRO,
ROBERT E. BAINBRIDGE.